(12) United States Patent
Wu et al.

(10) Patent No.: US 8,076,799 B2
(45) Date of Patent: Dec. 13, 2011

(54) UPS SYSTEM HAVING A FUNCTION OF PARALLEL OPERATION

(75) Inventors: Chin-Chang Wu, Kaohsiung (TW); Hung-Liang Chou, Kaohsiung (TW); Yu-Hsiu Lin, Kaohsiung (TW); Wen-Jie Hou, Kaohsiung (TW); Han-Sheng Wei, Kaohsiung (TW)

(73) Assignee: Ablerex Electronics Co., Ltd., Taipei Hsien (TW)

( * ) Notice: Subject to any disclaimer, the term of this patent is extended or adjusted under 35 U.S.C. 154(b) by 700 days.

(21) Appl. No.: 12/194,014

(22) Filed: Aug. 19, 2008

(65) Prior Publication Data
US 2009/0174260 A1   Jul. 9, 2009

(30) Foreign Application Priority Data
Jan. 7, 2008 (TW) .............................. 97100607 A

(51) Int. Cl.
*H02J 9/00* (2006.01)

(52) U.S. Cl. ............................................ 307/65; 307/64
(58) Field of Classification Search ............... 307/64–66
See application file for complete search history.

(56) References Cited

U.S. PATENT DOCUMENTS

| | | | |
|---|---|---|---|
| 6,445,089 B1 * | 9/2002 | Okui ................................ | 307/66 |
| 7,239,043 B2 * | 7/2007 | Taimela et al. .................. | 307/66 |
| 2007/0114852 A1 * | 5/2007 | Lin et al. ......................... | 307/66 |

* cited by examiner

*Primary Examiner* — Fritz M Fleming
(74) *Attorney, Agent, or Firm* — Alan Kamrath; Kamrath & Associates PA

(57) ABSTRACT

A UPS system includes one or more UPS units with identical or different capacities. A control circuit, used to control a DC/AC inverter of the UPS unit, includes a voltage feedback control circuit and a current feedforward control circuit. The voltage feedback control circuit is used to control the amplitude and the waveform of load voltage. The current feedforward control circuit is used to operate the DC/AC inverter of the UPS unit as a virtual fundamental resistor and a virtual harmonic resistor which are serially connected to an output terminal of the DC/AC inverter such that each UPS unit can be distributed to provide an output current according to the capacity ratio of the UPS system.

20 Claims, 3 Drawing Sheets

UPS SYSTEM HAVING A FUNCTION OF PARALLEL OPERATION

BACKGROUND OF THE INVENTION

1. Field of the Invention

The present invention relates to a UPS (uninterrupted power supply) system having a function of parallel operation. Particularly, the present invention relates to the UPS system functioned to control a plurality of UPS units with identical or different capacities in parallel operation. More particularly, the present invention relates to the UPS system functioned to control each UPS unit depending upon its capacity ratio such that each UPS unit can provide an output current according to the capacity ratio.

2. Description of the Related Art

As the capacity of load is continuously expanded, there still exists a need for further expanding the capacity of the UPS system in satisfying such a demand for expanding the capacity of load. However, there are two conventional manners in expanding the total capacity of the UPS system: one is increasing the capacity of a single UPS unit; and the other is connecting several small-capacity UPS units in parallel. In general, the manner of connecting the small-capacity UPS units in parallel, however, is better than that of increasing the capacity of a single UPS unit, since the parallel connection of the small-capacity UPS units is expandable in adjusting the total capacity of the UPS system according to needs and has a high degree of reliability of the UPS system in operation.

However, several problems must be considered in designing the parallel connection of the small-capacity UPS units for using in a UPS system. First, with regard to the operational problem of such a UPS system, the load currents distributed among the individual UPS units must be equal to avoid occurring overload on some of the UPS units. Another problem is a circular current occurring among the UPS units which may result in an increase of power loss and which may lower the total operational efficiency of the UPS system. In addition, the circular current may further result in occurring overload in some of the individual UPS units.

Typically, the conventional control method for the UPS system having a function of parallel operation includes a master-slave control method, a concentrated distribution control method, a logical distribution control method, a ring control method, and a droop control method.

Firstly, the master-slave control method requires operating one master UPS unit in a voltage-control mode so as to regulate its output voltage and to lower its harmonic distortion. The other UPS units are formed as slave UPS units operated in a current-control mode so as to equally divide the load current. The master-slave control method must utilize a load-current distribution circuit which is adapted to equally distribute the load currents to the UPS units. Accordingly, there is a need of providing a communication line among the UPS units for transmitting the current distributional information.

The concentrated distribution control method is similar to the master-slave control method. However, the concentrated distribution control method requires operating all of the UPS units in current-control mode. However, the concentrated distribution control method must utilize a load-current distribution circuit which is used to determine the distributed load current of each UPS unit. Each of the UPS units must be controlled by an outer voltage control loop and an inner current control loop so as to regulate the output voltage and to lower the harmonic distortion.

The logical distribution control method requires detecting each output current of the individual UPS units and sending them to each control circuit of the individual UPS units. Thus, the control circuit can calculate a mean value of the total output currents of the individual UPS units acting as a reference signal and utilizes a current-control mode to control the output current of the individual UPS unit to be identical with the reference signal. Accordingly, the logical distribution control method accomplishes the distribution of the output currents of the individual UPS units.

The ring control method is similar to the logical distribution control method, but this method need not collect each output current of the UPS units. However, the ring control method only requires a first UPS unit to retrieve an output current of a final UPS unit and each middle UPS unit to retrieve an output current of a preceding UPS unit. Each retrieved output current is acted as a reference signal. All control circuits of the UPS units are arranged in a ring structure. The UPS unit utilizing the current-control mode can control its output current to be identical with the reference signal. Accordingly, all of the output currents of the UPS units are identical.

As is apparent from the above description, these four methods require providing a communication line among the UPS units for transmitting the current distributional information. However, the current distributional information during communication is susceptible to be interfered with, such that the reliability of the UPS system may be poor.

Another control method for the UPS system having a function of parallel operation is the droop control method which is implemented by a PQ (real and reactive power) control method. The PQ control method requires each UPS unit to control an output real power (P) and an output reactive power (Q) by controlling the phase and amplitude of its output voltage, respectively. In order to stabilize the UPS system in operation, the droop control method requires both of frequency and amplitude of the output voltage of the UPS unit to be in inverse proportion to its output current as if there is a negative slope of relationship therebetween. Thus, such a control method is so called the "droop control method." In the droop control method, the output voltage of the UPS unit will decrease as its output current increases. Accordingly, the output currents of the UPS units are not identical. During increasing the negative slope, each of the UPS units has a better effect upon the equalized output current, but the voltage regulation of the UPS unit is degraded. Conversely, during decreasing the negative slope, the voltage regulation of the load voltage is improved, but each of the UPS units has a poor effect upon the equalized output current. Although it would be an advantage to omit transmitting the current distributional information among the UPS units in the droop control method, the output current equalization of the UPS units and voltage regulation of the load voltages are degraded.

It would be an advantage to arrange the UPS units with different capacities in parallel and to control each UPS unit according to its capacity, thereby combining the UPS units precisely and flexibly to match the load capacity, and reducing the installation cost of the UPS system. As can be seen in the previous description, the control method of the UPS system having a function of parallel operation is not suitable for the UPS units with various capacities but only suitable for the UPS units with identical capacity.

As is described in greater detail below, the present invention provides a UPS system having a function of parallel operation. The UPS system functions to control each UPS unit depending upon its capacity ratio, such that each UPS unit can be distributed to provide an output current according to the capacity ratio. Accordingly, the UPS system of the present invention can omit transmitting the current distributional information among the UPS units and can effectively increase a degree of reliability, simplify its control circuit, and improve its voltage regulation.

SUMMARY OF THE INVENTION

The primary objective of this invention is to provide a UPS system having a function of parallel operation. The UPS system including one or more UPS units functions to control each UPS unit depending upon its capacity ratio. Hence, each UPS unit can be distributed to provide an output current according to the capacity ratio.

Another objective of this invention is to provide the UPS system having a function of parallel operation. The UPS system functions to control each UPS unit depending upon its capacity ratio, such that each output current distribution of the UPS unit is similar to its capacity. Hence, each UPS unit can be distributed to provide an output current according to the capacity ratio.

Another objective of this invention is to provide the UPS system having a function of parallel operation. The UPS system functions to control each UPS unit depending upon its capacity ratio. Advantageously, the UPS system can omit communicating the distributional information of the output current among the UPS units.

The UPS system in accordance with an aspect of the present invention includes one or more UPS units with identical or different capacities. The UPS unit includes a DC/AC inverter and a control circuit. The control circuit is used to control the DC/AC inverter, and includes a voltage feedback control circuit and a current feedforward control circuit. The voltage feedback control circuit further includes a voltage-regulating circuit and a waveform-controlling circuit for controlling the amplitude and the waveform of load voltage respectively. The current feedforward control circuit detects an output current of the DC/AC inverter to retrieve its fundamental components and harmonic components which are amplified and operated as a virtual fundamental resistor and a virtual harmonic resistor. The virtual fundamental resistor and the virtual harmonic resistor are serially connected to an output terminal of the DC/AC inverter, and are operated at a fundamental frequency and a harmonic frequency. Outputs of the voltage feedback control circuit and the current feedforward control circuit are added to form a modulation signal which is sent to a PWM (Pulse Width Modulation) circuit to obtain drive signals of the DC/AC inverter.

In this manner, the UPS unit has equivalent output impedance formed from a series connection of the virtual fundamental resistor and the virtual harmonic resistor with an output filtering inductor. A gain of the current feedforward control circuit is inverse proportion to the capacity of the corresponding UPS unit such that the equivalent output impedance of each UPS unit is inverse proportion to its capacity so that the output currents of the UPS units are proportional to the corresponding capacity ratio of the UPS system. Furthermore, the virtual fundamental resistor can be further adjusted according to a ratio of an actual output current to a nominal current of the corresponding UPS unit so that each UPS unit can be distributed to provide an output current according to the capacity ratio.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
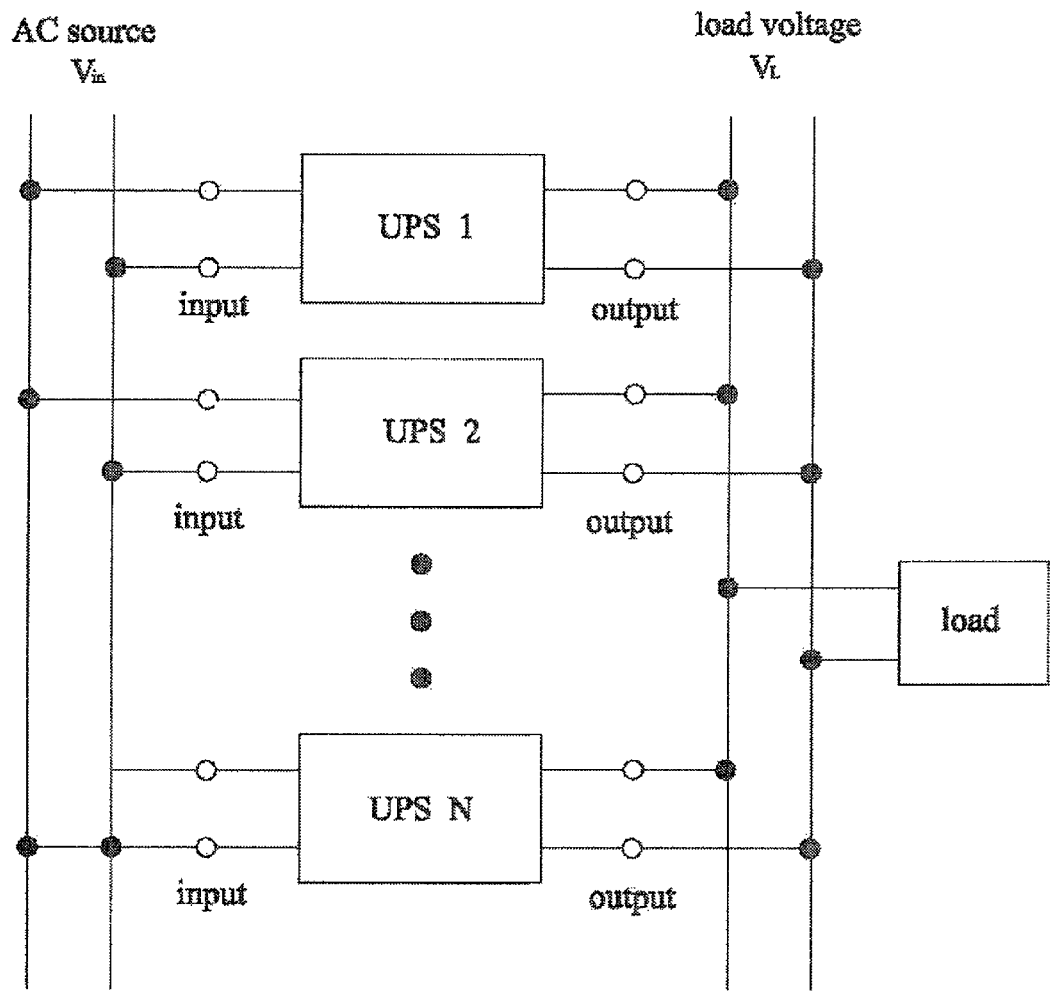
FIG. 1 is a schematic view of a UPS system having a function of parallel operation in accordance with the preferred embodiment of the present invention.

Referring to FIG. 1, a UPS system having a function of parallel operation in accordance with the preferred embodiment of the present invention includes a plurality of UPS units (identified as "UPS 1" to "UPS N") connected in parallel. Each UPS unit of the UPS system includes an input terminal connecting with an AC source, and an output terminal. The output terminal of the UPS units is connected in parallel to supply an AC power to at least one load. The UPS system in accordance with the preferred embodiment of the present invention does not require transmitting the current distributional information among the UPS units.

Figure 2A:
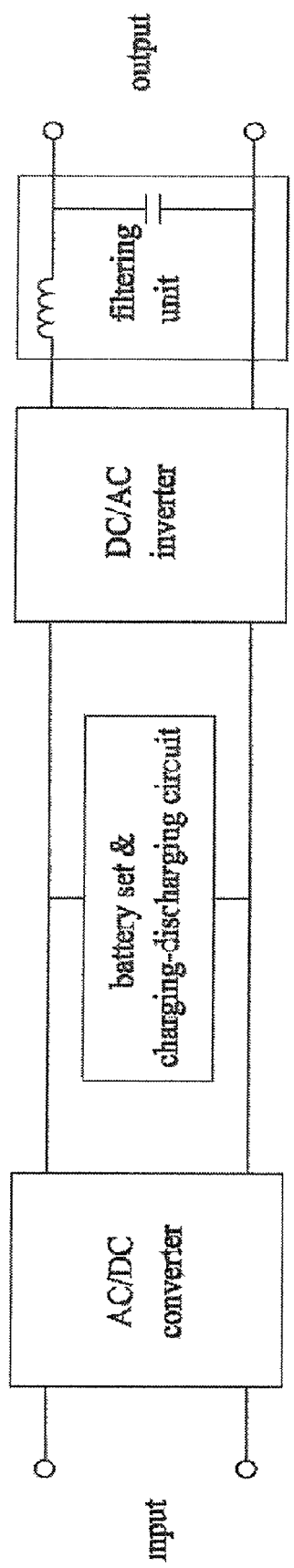
FIG. 2a is a schematic view of a single UPS unit arranged in the UPS system having the function of parallel operation in accordance with the preferred embodiment of the present invention.
Figure 2B:
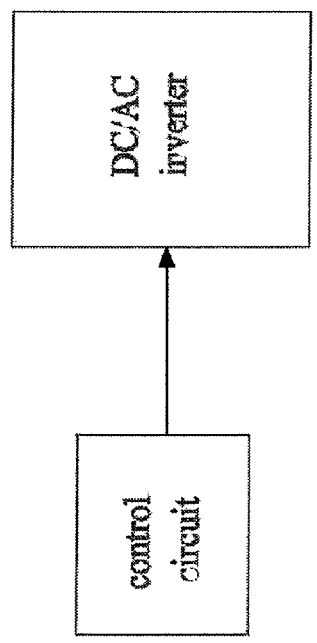
FIG. 2b is a schematic view of a control circuit applied to control a DC/AC inverter of the UPS unit of the UPS system in accordance with the preferred embodiment of the present invention.

Referring to FIG. 2a, each UPS unit of the UPS system in accordance with the preferred embodiment of the present invention includes an AC/DC converter, a battery set, a charging-discharging circuit, a DC/AC inverter and a filtering unit. Referring to FIG. 2b, each DC/AC inverter includes a control circuit electrically connected therewith. In operation, the control circuit is used to control the operation of the DC/AC inverter of the corresponding UPS unit.

Referring again to FIG. 2a, an input terminal of the AC/DC converter is electrically connected with the input terminal of the UPS unit for converting an AC power of the AC source into a DC power. The battery set is connected with an output terminal of the AC/DC converter via the charging-discharging circuit to charge or discharge the battery set. When the AC source is normal, the charging-discharging circuit is controlled to charge the battery set. Conversely, the AC source is abnormal, and the charging-discharging circuit is controlled to discharge the battery set as a backup power source. An input terminal of the DC/AC inverter is electrically connected with a connection point between the output terminal of the AC/DC converter and the charging-discharging circuit. An output terminal of the DC/AC inverter is electrically connected with the output terminal of the UPS unit via the filtering unit. The DC/AC inverter is capable of converting the DC power into an AC power which is supplied to the load via the output terminal of the UPS unit. The filtering unit is constructed from a filter inductor and a filter capacitor and is adapted to filter harmonics resulting from high frequency switching the DC/AC inverter.

Figure 3:
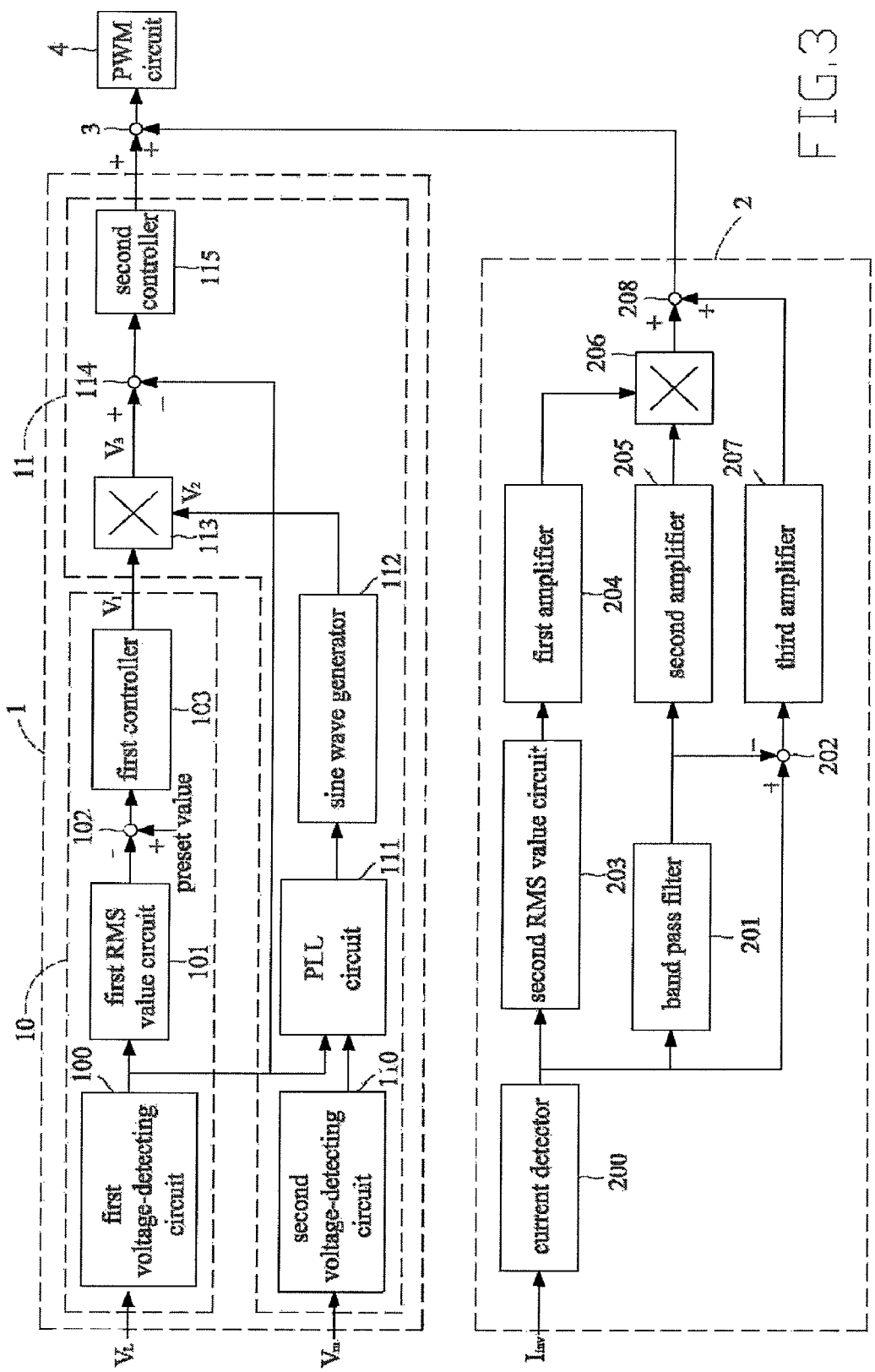
FIG. 3 is schematic view of a detail control circuit applied to control the DC/AC inverter, shown in FIG. 2b, of the UPS unit arranged in the UPS system in accordance with the preferred embodiment of the present invention.

Referring to FIGS. 2a, 2b and 3, the control circuit applied to control the DC/AC inverter of the UPS unit arranged in the UPS system in accordance with the preferred embodiment of the present invention is used to detect a load voltage $V_L$, an AC voltage $V_{in}$ and an output current $I_{inv}$ of the DC/AC inverter so as to accomplish distributing output currents of the UPS units depending upon the capacity ratio of the UPS units of the UPS system.

Referring again to FIG. 3, the control circuit, applied to control the DC/AC inverter of the UPS unit, in accordance with the preferred embodiment of the present invention includes a voltage feedback control circuit 1, a current feedforward control circuit 2, an adder 3 and a PWM circuit 4.

Referring again to FIG. 3, the voltage feedback control circuit 1 includes a voltage-regulating control circuit 10 and a waveform-controlling circuit 11. The voltage-regulating control circuit 10 is used to regulate the amplitude of load voltage. The voltage-regulating control circuit 10 includes a first voltage-detecting circuit 100, a first RMS value circuit 101, a subtractor 102 and a first controller 103. The first voltage-detecting circuit 100 is used to detect the load voltage $V_L$, and an output of the first voltage-detecting circuit 100 is sent to the first RMS value circuit 101 to retrieve an RMS value signal. The RMS value signal and a preset value are sent to the subtractor 102 to subtract the RMS value signal from a preset value which is a predetermined RMS value of the load voltage $V_L$. An output of the subtractor 102 is sent to the first controller 103 to obtain a first control signal $V_1$ which is a DC signal, and regarded as an output signal of the voltage-regulating control circuit 10.

Still referring to FIG. 3, the waveform-controlling circuit 11 is used to regulate a waveform of load voltage so as to lower harmonic distortion, and to supply a high quality of AC power to the load. The waveform-controlling circuit 11 includes a second voltage-detecting circuit 110, a PLL (phase lock loop) circuit 111, a sine wave generator 112, a first multiplier 113, a subtractor 114 and a second controller 115. The second voltage-detecting circuit 110 is used to detect the voltage $V_{in}$ of the AC source, and outputs of the first voltage-detecting circuit 100 and the second voltage-detecting circuit 110 are sent to the PLL circuit 111 to lock the phase of the voltage $V_{in}$ of the AC source. An output of the PLL circuit 111 is sent to the sine wave generator 112 which can generate a unity amplitude sine wave signal $V_2$. When the AC source is normal, a phase of the unity amplitude sine wave signal $V_2$ is identical with that of the voltage $V_{in}$ of the AC source. Conversely, when the AC source is abnormal, the unity amplitude sine wave signal $V_2$ and the load voltage $V_L$ are synchronous. Subsequently, the first control signal $V_1$ and the unit amplitude sine wave signal $V_2$ are sent to the first multiplier 113 to obtain a reference signal $V_3$. The reference signal $V_3$ and the output of the first voltage-detecting circuit 100 are sent to the subtractor 114 and are subtracted therein. An output of the subtractor 114 is sent to the second controller 115 which output an output control signal of the voltage feedback control circuit 1.

Still referring to FIG. 3, the current feedforward control circuit 2 is used to detect an output current $I_{inv}$ of the DC/AC inverter and to retrieve fundamental and harmonic components from the output current $I_{inv}$. The fundamental component and the harmonic components are amplified in different gain and are operated as a virtual fundamental resistor and a virtual harmonic resistor respectively. The amplified fundamental component can actuate the DC/AC inverter to generate a voltage which is proportional to the fundamental component of the output current $I_{inv}$ of the DC/AC inverter. In this manner, the amplified fundamental component operates the DC/AC inverter as a virtual fundamental resistor serially connected with the output terminal of the DC/AC inverter. The virtual fundamental resistor can be used to control a current distribution among the UPS units arranged in the UPS system. The equivalent output impedance of the UPS unit is formed from a serial connection of the virtual fundamental resistor, the virtual harmonic resistor and the filter inductor of the filtering unit. An output current of the UPS units is in inverse proportion to its equivalent output impedance formed in the UPS unit. Consequently, the amplification of the fundamental component performed in the current feedforward control circuit 2 must be designed to be in inverse proportion to the capacity of the UPS unit. The amplified harmonic components performed in the current feedforward control circuit 2 can actuate the DC/AC inverter to generate a voltage which is proportional to the harmonic components of the output current $I_{inv}$ of the DC/AC inverter. In this manner, the amplified harmonic components operate the DC/AC inverter as a virtual harmonic resistor serially connected with the output terminal of the DC/AC inverter. The virtual harmonic resistor is formed as a damping of the filtering unit, so as to avoid high frequency oscillation occurring. Advantageously, the design of the second controller 115 of the waveform-controlling circuit 11 can be simplified, since the virtual harmonic resistor is acting as a damping of the filtering unit.

With continued reference to FIG. 3, the current feedforward control circuit 2 includes a current detector 200, a band pass filter 201, a subtractor 202, a second RMS value circuit 203, a first amplifier 204, a second amplifier 205, a second multiplier 206, a third amplifier 207 and an adder 208. The current detector 200 is used to detect an output current $I_{inv}$ of the DC/AC inverter. An output of the current detector 200 is sent to the band pass filter 201 which has a center frequency identical with the fundamental frequency (60 Hz) of the AC source to retrieve the fundamental component of the output current $I_{inv}$ of the DC/AC inverter. Subsequently, outputs of the current detector 200 and the band pass filter 201 are sent to the subtractor 202 and are subtracted to thereby obtain the harmonic components of the output current $I_{inv}$ of the DC/AC inverter. The output of the current detector 200 is further sent to the second RMS value circuit 203. An output of the second RMS value circuit 203 is sent to the first amplifier 204 which has an amplification (i.e. gain) proportional to a reciprocal of each nominal current of the UPS units. Namely, an output of the first amplifier 204 is a normalized value of the output current $I_{inv}$ of the DC/AC inverter. Furthermore, the output of the band pass filter 201 is sent to the second amplifier 205. The gain of the second amplifier 205 is in inverse proportion to the capacity of the UPS unit. Accordingly, as the output capacity of the UPS unit increases, the gain of the second amplifier 205 decreases. Conversely, as the output capacity of the UPS unit decreases, the gain of the second amplifier 205 increases. This results in the DC/AC inverter operated by the amplified fundamental component forming a virtual fundamental resistor being in inverse proportion to the output capacity of the UPS unit. Subsequently, the outputs of the second amplifier 205 and the first amplifier 204 are sent to the second multiplier 206 and are multiplied.

In addition, an output of the subtractor 202 (i.e. the harmonic components of the output current $I_{inv}$ of the DC/AC inverter) is sent to the third amplifier 207. The gain of the third amplifier 207 is also in inverse proportion to the capacity of the UPS unit. Accordingly, as the output capacity of the UPS unit increases, the gain of the third amplifier 207 decreases. Conversely, as the output capacity of the UPS unit decreases, the gain of the third amplifier 207 increases. This also results in the DC/AC inverter operated by the amplified harmonic components forming a virtual harmonic resistor being in inverse proportion to the output capacity of the UPS unit.

Subsequently, outputs of the second multiplier 206 and the third amplifier 207 are sent to the adder 208 and are added to obtain an output control signal of the current feedforward control circuit 2. It is apparent from the output control signal of the current feedforward control circuit 2 that the fundamental and harmonic components of the output current I/$_{inv}$ of the DC/AC inverter are amplified by the gain (i.e. the gains of the second amplifier 205 and the third amplifier 207) which are in inverse proportion to the output capacity of the UPS unit. Consequently, the equivalent output impedance of the DC/AC inverter is in inverse proportion to the output capacity of the corresponding UPS unit. Thus, each output current of the UPS unit can be distributed depending upon the capacity ratio of the UPS unit arranged in the UPS system.

With regard to the problematic aspects practically occurring during the manufacture of the UPS units, circuit parameters of the UPS units are susceptible to slight variations which result in failure in distributing the output current of the UPS unit depending upon its capacity ratio. In consideration of this task, the output of the second RMS value circuit 203 is sent to the first amplifier 204 for correcting the virtual fundamental resistor by the second multiplier 206. Accordingly, the output current of the UPS unit can be adjusted by the ratio of actual output current and nominal current of the UPS unit such that the influence of the variation of circuit parameters of the UPS units can be improved. Furthermore, each output current of the UPS unit can be distributed according to the capacity ratio of the UPS unit arranged in the UPS system.

Referring again to FIG. 3, the outputs of the voltage feedback control circuit 1 and the current feedforward control circuit 2 are sent to the adder 3, and are added to obtain a modulation signal which is sent to the PWM circuit 4 to obtain drive signals of the DC/AC inverter.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A UPS system comprising:
at least one UPS unit including a DC/AC inverter and a control circuit, with the control circuit provided in the DC/AC inverter and used to control the DC/AC inverter;
with the control circuit of the DC/AC inverter including a voltage feedback control circuit, a current feedforward control circuit, an adder and a PWM circuit;
wherein outputs of the voltage feedback control circuit and the current feedforward control circuit are sent to the adder to obtain a modulation signal which is sent to the PWM circuit to obtain a drive signal for controlling the DC/AC inverter of the UPS unit; and
wherein the current feedforward control circuit operates the DC/AC inverter as a virtual fundamental resistor and a virtual harmonic resistor connected serially to an output terminal of the DC/AC inverter.

2. A UPS system comprising:
a plurality of UPS units connected in parallel, with the UPS units provided with identical or different capacities, with each of the UPS units including a DC/AC inverter and a control circuit, with the control circuit provided in the DC/AC inverter and used to control the DC/AC inverter; with each of the control circuit of the DC/AC inverter including a voltage feedback control circuit, a current feedforward control circuit, an adder and a PWM circuit;
wherein outputs of the voltage feedback control circuit and the current feedforward control circuit are sent to the adder to obtain a modulation signal which is sent to the PWM circuit to obtain drive signals for controlling each of the DC/AC inverters of the UPS units; and
wherein the current feedforward control circuit operates the DC/AC inverter as a virtual fundamental resistor and a virtual harmonic resistor connected serially to an output terminal of the DC/AC inverter.

3. The UPS system as defined in claim 2, wherein each of the plurality of UPS units includes an input terminal connecting with an AC source, and an output terminal; wherein the output terminals of the plurality of UPS units are connected in parallel to supply an AC power to at least one load.

4. The UPS system as defined in claim 2, wherein the voltage feedback control circuit includes a voltage-regulating control circuit and a waveform-controlling circuit; wherein the voltage-regulating control circuit regulates an amplitude of load voltage, and wherein the waveform-controlling circuit regulates a waveform of load voltage so as to lower harmonic distortion.

5. The UPS system as defined in claim 4, wherein the voltage-regulating control circuit includes a first voltage-detecting circuit, a first RMS value circuit, a subtractor and a first controller; wherein the first voltage-detecting circuit detects the load voltage, and wherein an output of the first voltage-detecting circuit is sent to the first RMS value circuit to retrieve an RMS value signal; wherein the RMS value signal and a preset value are sent to the subtractor to subtract the RMS value signal from the preset value which is a predetermined RMS value of the load voltage; and wherein an output of the subtractor is sent to the first controller to obtain a first control signal.

6. The UPS system as defined in claim 4, wherein the waveform-controlling circuit includes a second voltage-detecting circuit, a phase lock loop circuit, a sine wave generator, a first multiplier, a subtractor and a second controller; wherein the second voltage-detecting circuit detects a voltage of the AC source, and wherein outputs of a first voltage-detecting circuit of the voltage-regulating control circuit and the second voltage-detecting circuit are sent to the phase lock loop circuit to lock the phase of the voltage of the AC source; wherein an output of the phase lock loop circuit is sent to the sine wave generator generating a unity amplitude sine wave signal; wherein a first control signal of the voltage-regulating control circuit and the unity amplitude sine wave signal are sent to the first multiplier to obtain a reference signal; wherein the reference signal and the output of the first voltage-detecting circuit are sent to the subtractor; wherein an output of the subtractor is sent to the second controller which output an output control signal of the voltage feedback control circuit.

7. The UPS system as defined in claim 2, wherein the virtual fundamental resistor and the virtual harmonic resistor are in inverse proportion to each capacity of the UPS units such that each of the UPS units is distributed to provide an output current according to a capacity ratio of the UPS unit arranged in the UPS system.

8. The UPS system as defined in claim 2, wherein the current feedforward control circuit includes a current detector, a band pass filter, a subtractor, a second RMS value circuit, a first amplifier, a second amplifier, a third amplifier, a second multiplier and an adder; wherein the current detector detects an output current of the DC/AC inverter, wherein an output of the current detector is sent to the band pass filter to retrieve fundamental components of the output current of the DC/AC inverter; wherein the output of the current detector and an output of the band pass filter are sent to the subtractor to obtain harmonic components of the output current of the DC/AC inverter; wherein the output of the current detector is further sent to the second RMS value circuit, wherein an output of the second RMS value circuit is sent to the first amplifier; wherein the output of the band pass filter is sent to the second amplifier; an output of the subtractor is sent to the third amplifier; wherein outputs of the second amplifier and the first amplifier are sent to the second multiplier; and wherein outputs of the second multiplier and the third amplifier are sent to the adder to obtain an output control signal of the current feedforward control circuit.

9. The UPS system as defined in claim 8, wherein gains of the second amplifier and the third amplifier are in inverse proportion to the capacity of the corresponding UPS unit.

10. The UPS system as defined in claim 8, wherein a gain of the first amplifier is proportional to a reciprocal of each nominal current of the corresponding UPS unit such that an output of the first amplifier is normalized by the nominal current of the corresponding UPS unit.

11. A UPS system comprising:
a plurality of UPS units connected in parallel, with the plurality of UPS units provided with different capacities, with each of the plurality of UPS units including a DC/AC inverter and a control circuit, with the control circuit provided in the DC/AC inverter and used to control the DC/AC inverter;
wherein each of the control circuits controls the corresponding UPS unit depending upon a capacity ratio of the corresponding UPS unit, wherein a ratio of output currents of the plurality of UPS units approaches a capacity ratio of the plurality of UPS units;
wherein each of the control circuits includes a current feedforward control circuit; and
wherein the current feedforward control circuit operates the DC/AC inverter as a virtual fundamental resistor and a virtual harmonic resistor connected serially to an output terminal of the DC/AC inverter.

12. The UPS system as defined in claim 11, wherein each of the plurality of UPS units includes an input terminal connecting with an AC source, and an output terminal, wherein the output terminals of the plurality of UPS units are connected in parallel to supply an AC power to at least one load.

13. The UPS system as defined in claim 12, wherein each of the control circuits further includes a voltage feedback control circuit, an adder and a PWM circuit; wherein outputs of the voltage feedback control circuit and the current feedforward control circuit are sent to the adder to obtain a modulation signal which is sent to the PWM circuit to obtain a drive signal of each of the plurality of UPS units.

14. The UPS system as defined in claim 13, wherein the voltage feedback control circuit includes a voltage-regulating control circuit and a waveform-controlling circuit; wherein the voltage-regulating control circuit regulates an amplitude of load voltage, and wherein the waveform-controlling circuit regulates a waveform of load voltage so as to lower harmonic distortion.

15. The UPS system as defined in claim 14, wherein the voltage-regulating control circuit includes a first voltage-detecting circuit, a first RMS value circuit, a subtractor and a first controller; wherein the first voltage-detecting circuit detects the load voltage, and wherein an output of the first voltage-detecting circuit is sent to the first RMS value circuit to retrieve an RMS value signal; wherein the RMS value signal and a preset value are sent to the subtractor to subtract the RMS value signal from the preset value which is a predetermined RMS value of the load voltage; and wherein an output of the subtractor is sent to the first controller to obtain a first control signal.

16. The UPS system as defined in claim 14, wherein the voltage-regulating control circuit includes a first voltage-detecting circuit; wherein the waveform-controlling circuit includes a second voltage-detecting circuit, a phase lock loop circuit, a sine wave generator, a first multiplier, a subtractor and a second controller; wherein the second voltage-detecting circuit detects a voltage of the AC source, and wherein outputs of the first voltage-detecting circuit and the second voltage-detecting circuit are sent to the phase lock loop circuit to lock a phase of the voltage of the AC source; wherein an output of the phase lock loop circuit is sent to the sine wave generator generating a unity amplitude sine wave signal; wherein a first control signal of the voltage-regulating control circuit and the unity amplitude sine wave signal are sent to the first multiplier to obtain a reference signal; wherein the reference signal and the output of the first voltage-detecting circuit are sent to the subtractor; and wherein an output of the subtractor is sent to the second controller which outputs an output control signal of the voltage feedback control circuit.

17. The UPS system as defined in claim 13, wherein the virtual fundamental resistor and the virtual harmonic resistor are in inverse proportion to each capacity of the plurality of UPS units, wherein each of the plurality of UPS units is distributed to provide the output current according to the capacity ratio of the UPS unit arranged in the UPS system.

18. The UPS system as defined in claim 13, wherein the current feedforward control circuit includes a current detector, a band pass filter, a subtractor, a RMS value circuit, a first amplifier, a second amplifier, a third amplifier, a multiplier and an adder; wherein the current detector detects an output current of the DC/AC inverter, wherein an output of the current detector is sent to the band pass filter to retrieve fundamental components of the output current of the DC/AC inverter; wherein the output of the current detector and an output of the band pass filter are sent to the subtractor to obtain harmonic components of the output current of the DC/AC inverter; wherein the output of the current detector is further sent to the RMS value circuit, wherein an output of the RMS value circuit is sent to the first amplifier; wherein the output of the band pass filter is sent to the second amplifier; wherein an output of the subtractor is sent to the third amplifier; wherein outputs of the second amplifier and the first amplifier are sent to the multiplier; and wherein outputs of the multiplier and the third amplifier are sent to the adder to obtain an output control signal of the current feedforward control circuit.

19. The UPS system as defined in claim 18, wherein gains of the second amplifier and the third amplifier are in inverse proportion to the capacity of the corresponding UPS unit.

20. The UPS system as defined in claim 18, wherein a gain of the first amplifier is proportional to a reciprocal of each nominal current of the corresponding UPS units, wherein an output of the first amplifier is normalized by the nominal current of the corresponding UPS unit.

* * * * *